US009260054B1

United States Patent
McHomes et al.

(10) Patent No.: US 9,260,054 B1
(45) Date of Patent: Feb. 16, 2016

(54) EXTERNAL SEAT BELT INDICATOR LIGHT

(71) Applicants: Joe Lewis McHomes, Perry, GA (US); Josef Rasheed McHomes, Perry, GA (US); Antonio Jamaal McHomes, Perry, GA (US)

(72) Inventors: Joe Lewis McHomes, Perry, GA (US); Josef Rasheed McHomes, Perry, GA (US); Antonio Jamaal McHomes, Perry, GA (US)

(*) Notice: Subject to any disclaimer, the term of this patent is extended or adjusted under 35 U.S.C. 154(b) by 0 days.

(21) Appl. No.: 14/247,908

(22) Filed: Apr. 8, 2014

Related U.S. Application Data

(60) Provisional application No. 61/813,751, filed on Apr. 19, 2013.

(51) Int. Cl.
*B60Q 1/26* (2006.01)
(52) U.S. Cl.
CPC ........................................ *B60Q 1/26* (2013.01)
(58) Field of Classification Search
CPC ................. B60R 21/01546; B60R 2022/4858; B60R 2022/4875; B60N 2/002
USPC ................... 340/468, 457.1, 461, 458, 425.5; 180/268, 273
See application file for complete search history.

(56) References Cited

U.S. PATENT DOCUMENTS

| 3,875,556 | A | 4/1975 | Beaird | |
|---|---|---|---|---|
| 6,215,395 | B1 * | 4/2001 | Slaughter et al. | 340/457.1 |
| 7,005,976 | B2 * | 2/2006 | Hagenbuch | 340/457.1 |
| 7,283,043 | B1 * | 10/2007 | Harrison | 340/457.1 |
| 7,511,610 | B2 * | 3/2009 | Downey et al. | 340/457.1 |
| 7,812,716 | B1 * | 10/2010 | Cotter | 340/457.1 |
| 8,081,068 | B1 * | 12/2011 | Tolmei | 340/468 |
| 2005/0156726 | A1 * | 7/2005 | Rubel | 340/457.1 |
| 2008/0223645 | A1 * | 9/2008 | Shaw | 180/270 |
| 2009/0096624 | A1 | 4/2009 | Stengel et al. | |
| 2009/0299577 | A1 | 12/2009 | Demant | |

* cited by examiner

*Primary Examiner* — Phung Nguyen

(57) ABSTRACT

An external seatbelt indicator provides a red indicator light that appears on the front and rear of the vehicle when the driver's seat is occupied, the vehicle's ignition switch is in the on position, the vehicle is in any forward or reverse gear, and the driver's seatbelt is unfastened. The red indicator light may include, but is not limited to a written message, such as, "No Seat Belt," or it may be in another form, such as a silhouette of a seated person wearing a seatbelt and shoulder harness.

10 Claims, 2 Drawing Sheets

EXTERNAL SEAT BELT INDICATOR LIGHT

CROSS-REFERENCE TO RELATED APPLICATIONS

This application claims priority to U.S. Provisional Application No. 61/813,751, filed Apr. 19, 2013.

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The invention relates generally to vehicle safety systems and in particular to an external seatbelt status indicator. The laws of all 50 states require vehicle drivers to fasten their seatbelts when the vehicle is in motion, and with the use of retracting seatbelts and shoulder harnesses. However, the position of the seatbelt is not easily discernible from a substantial distance by law enforcement officers. An external seatbelt indicator light, displaying an indication that the seatbelt is unfastened, that is clearly visible by day or night would assist in enforcement, both by advertising to law enforcement officers that the seatbelt is not fastened and by advertising to the general public, thereby subjecting an un-seatbelted driver to social enforcement mechanisms. The result would be saved lives and reduced injuries in accidents from increased seatbelt usage. It would also increase revenue for government units, by enabling law enforcement officers to write more tickets for seatbelt violations.

SUMMARY OF THE INVENTION

Accordingly, the invention is directed to an external seatbelt indicator light. A red indicator light appears on the front and rear of the vehicle when the driver's seat is occupied, the vehicle's ignition switch is in the on position, and the driver's seatbelt is unfastened. The red indicator light may include, but is not limited to a written message, such as, "No Seat Belt," or it may be in another form, such as a silhouette of a seated person wearing a seatbelt and shoulder harness.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWINGS

The accompanying drawings are included to provide a further understanding of the invention and are incorporated into and constitute a part of the specification. They illustrate one embodiment of the invention and, together with the description, serve to explain the principles of the invention.

DETAILED DESCRIPTION OF THE INVENTION

Figure 1:
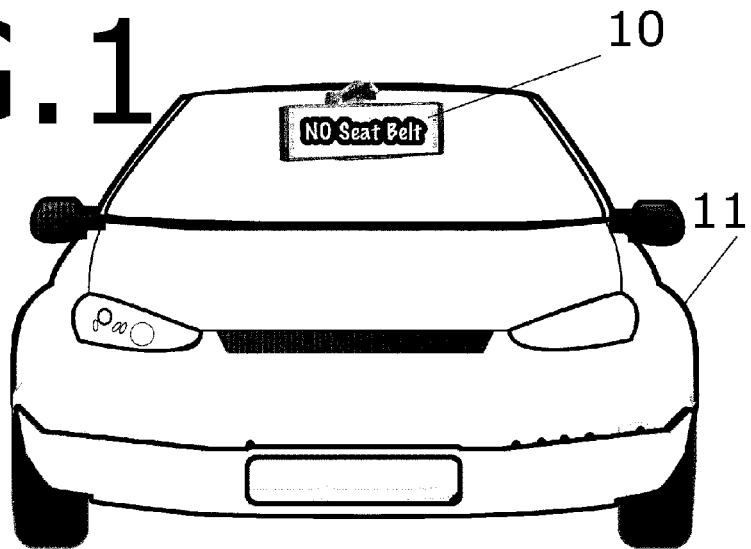
FIG. 1 shows a front view of a vehicle with the first exemplary embodiment installed, displaying the red indicator light 10, and the vehicle 11.
Figure 2:
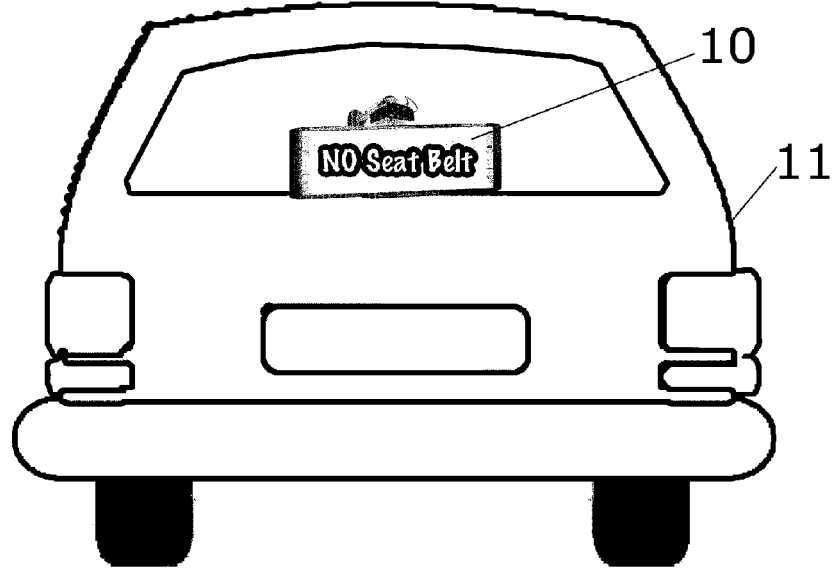
FIG. 2 shows a rear view of a vehicle with the first exemplary embodiment installed, displaying the red indicator light 10, and the vehicle 11.
Figure 3:
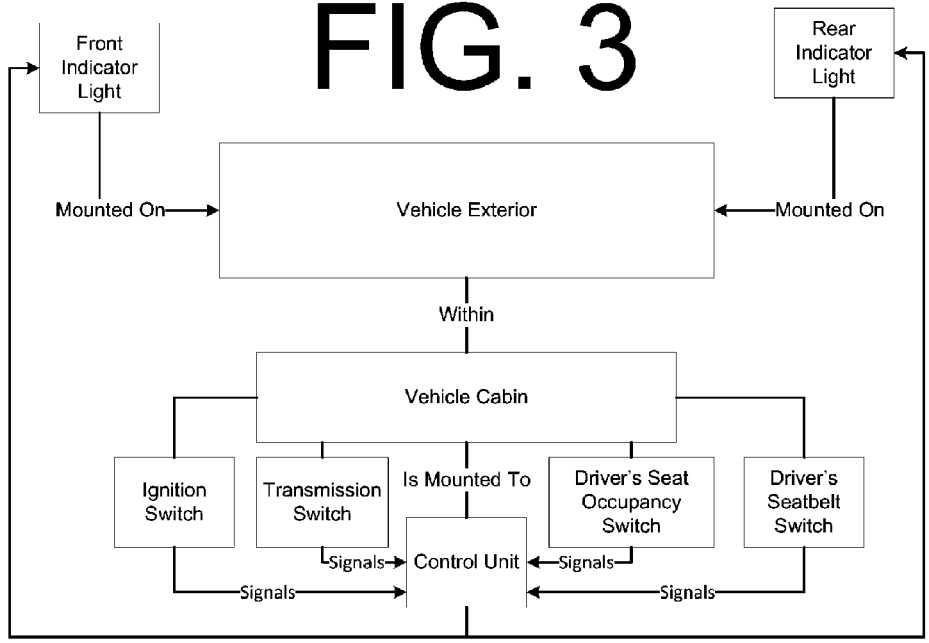
FIG. 3 shows a diagram of the components of the invention and their logical relationships.
Figure 4:
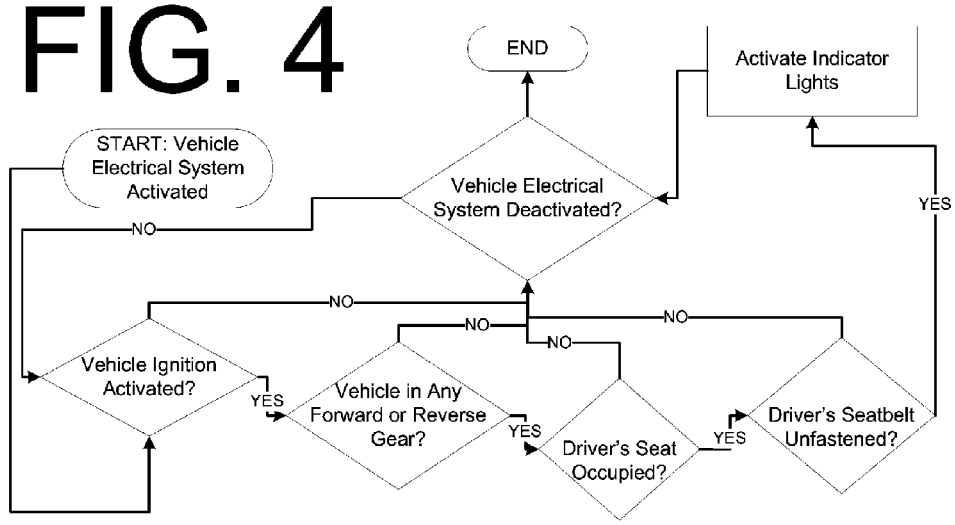
FIG. 4 shows a flow chart diagram of the steps of the invention's operation.

Referring now to the invention in more detail, the invention is directed to an external seatbelt indicator light 10. A red indicator light 10 appears on the front and rear of the vehicle 11 when the driver's seat is occupied, the ignition switch of the vehicle 11 is in the "on" position, and the driver's seatbelt is unfastened. The red indicator light 10 may include, but is not limited to a written message, such as, "No Seat Belt," or it may be in another form, such as a silhouette of a seated person wearing a seatbelt and shoulder harness.

The device consists of two red indicator lights 10, mounted on the front and rear of the vehicle 11, and a control unit, preferably mounted under the dashboard, under the center console, or other location within the vehicle cabin. The control unit is connected via wires or alternative signal transfer devices (e.g. wireless) to the red indicator lights 10 and to a set of four switches. The first switch, a vehicle ignition switch, activates when the ignition switch of the vehicle 11 in the on position. The second switch, a vehicle transmission switch, activates when the transmission is in any forward or reverse gear. The third switch, a driver's seat occupancy switch, is a pressure switch located within the driver's seat, and activates when a person is occupying the driver's seat. The fourth switch, a driver's seatbelt switch, activates when the driver's seatbelt is unfastened. When all four switches are activated, the control unit activates the red indicator lights 10.

In the first exemplary embodiment, each red indicator light 10 would display the phrase, "No Seat Belt." In a sedan or coupe, the red indicator light 10 on the front of the vehicle 11 would preferably be mounted on the top center of the front windshield, in front of the rearview mirror; and the red indicator light 10 on the rear of the vehicle 11 would preferably be mounted on the center of the rear window, over or next to the rear window brake light, facing out through the rear window above the trunk lid. For other vehicle models, the red indicator lights 10 would preferably be mounted in comparable positions.

The above-described four-switch logic may be achieved via the arrangement of the switches in electrical series. Alternatively, the same logic may achieved through the use of a software program running on a computer comprising a microprocessor, digital memory, data storage medium, and appropriate interface devices to operate the four switches and the indicator lights.

In the second exemplary embodiment, each red indicator light 10 would display a silhouette of a seated person wearing a seatbelt and shoulder harness. The indicator light 10 is preferably one and one-fourth inches wide by three and one-fourth inches tall. Other embodiments, displaying other written messages or symbols indicating that the driver's seatbelt is unfastened, are also contemplated.

Further embodiments are contemplated wherein the red indicator light 10 is made machine-detectable. This may be achieved by replacing the visible light emitter with an emitter in a more readily machine-detectable band of the electromagnetic spectrum, for example the microwave and radiofrequency bands. Alternatively, the visible light emitter may emit in an identifiable visible band or may be configured to blink an identifiable pattern or carry a signal. In these embodiments, the emitted signals or patterns are received directly by law enforcement through ground or vehicle-based equipment linked to law enforcement data systems.

To use the device, the user simply sits in the driver's seat of the vehicle 11, and turns the ignition switch to the "on" position. The device operates automatically. The power source for the device is preferably the electrical system of the vehicle 11. Other embodiments that are powered by replaceable or rechargeable batteries are contemplated. The device is intended for installation as original equipment by the vehicle manufacturer. Other embodiments that can be installed as an after-market modification, by the owner of the vehicle 11 or by a repair shop or customizing shop, are also contemplated.

The control unit, and the housings of the red indicator lights 10, would preferably be manufactured from durable, rigid materials, such as aluminum, steel, brass, and high-impact plastic. The outer lenses of the red indicator lights 10 would preferably be manufactured from a durable, rigid, translucent material, such as plastic, glass, or transparent thermoplastic. The wires connecting the components would preferably be manufactured from copper sheathed in plastic. Components, component sizes and materials listed above are preferable, but artisans will recognize that alternate components and materials could be selected without altering the scope of the invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

We claim:

1. A system for detecting whether a vehicle driver is wearing a fastened seat belt while the vehicle is in operation, comprising:
   (a) a control unit;
   (b) said control unit being affixed to the interior of the vehicle cabin within the front half of the passenger compartment of the vehicle;
   (c) said control unit being connected to four switches; and
   (d) said control unit being connected to a plurality of external seatbelt indicator lights;
   (e) said plurality of external seatbelt indicator lights emit light comprising a machine-readable component whereby said machine-readable component is detectable to law enforcement equipment and is placed in electronic communication with law enforcement data systems whereby the simultaneous activation of all four of said four switches would cause said control unit to activate said plurality of external seatbelt indicator lights, and deactivation of any of said four switches would cause said control unit to deactivate said plurality of external seatbelt indicator lights.

2. The system of claim 1 wherein the first of said four switches activates when the ignition switch of the vehicle is in the "on" position, and deactivates when the ignition switch of the vehicle is in the "off" position.

3. The system of claim 1 wherein the second of said four switches activates when the transmission of the vehicle is in any forward or reverse gear, and deactivates when the transmission of the vehicle is in "park" or "neutral".

4. The system of claim 1 wherein the third of said four switches is a pressure switch, activating when it detects sufficient pressure on the driver's seat of the vehicle to approximate the weight of any adult occupying said driver's seat of the vehicle, and deactivating when it detects a sufficient decrease in said pressure to indicate that the adult occupant of said driver's seat of the vehicle has exited the vehicle.

5. The system of claim 1 wherein the fourth of said four switches activates when the driver's seatbelt of the vehicle is unfastened, and deactivates when said driver's seatbelt of the vehicle is fastened.

6. The system of claim 1 wherein one of said plurality of external seatbelt indicator lights is mounted on the front of the vehicle, in such a manner as to be visible from a substantial distance in front of the vehicle.

7. The system of claim 1 wherein one of said plurality of external seatbelt indicator lights is mounted on the rear of the vehicle, in such a manner as to be visible from a substantial distance behind the vehicle.

8. The system of claim 1 wherein said plurality of external seatbelt indicator lights are red in color.

9. The system of claim 8 wherein said plurality of external seatbelt indicator lights display the printed message, "No Seat Belt".

10. The system of claim 8 wherein said plurality of external seatbelt indicator lights display a silhouette of a seated person wearing a seatbelt and shoulder harness.

* * * * *